Jan. 2, 1945.   H. E. WILLOCK   2,366,166
MOTOR VEHICLE CHASSIS
Filed July 29, 1943

INVENTOR
HARRY EDWARD WILLOCK
Ernest E Carver
ATTORNEY.

Patented Jan. 2, 1945

2,366,166

UNITED STATES PATENT OFFICE 2,366,166

MOTOR VEHICLE CHASSIS

Harry Edward Willock, Vancouver, British Columbia, Canada

Application July 29, 1943, Serial No. 496,560

4 Claims. (Cl. 280—112)

My invention relates to improvements in motor vehicle chassis which is particularly adapted for trucks. The objects of the invention are primarily to provide a chassis for motor vehicles, especially of the heavy truck type, which will eliminate torsion strains causing breakage or failure of said chassis; to provide suitable bearing supports for the drive shaft between the transmission and rear axle housing and to provide a convenient means for changing a truck from say a long bodied platform truck to a shorter bodied truck such as a dump or the like by substituting one rear portion for another.

The invention contemplates the division of the chassis transversely at a point behind the motor and the interposition of a longitudinally arranged sleeve bearing between the forward and rearward parts of the chassis and the mounting of a bearing within the sleeve to journal an intermediate portion of the drive shaft, as will be more fully described in the following specification and shown in the accompanying drawing, in which.

In the drawing like characters of reference indicate corresponding parts in each figure.

Figure 1:
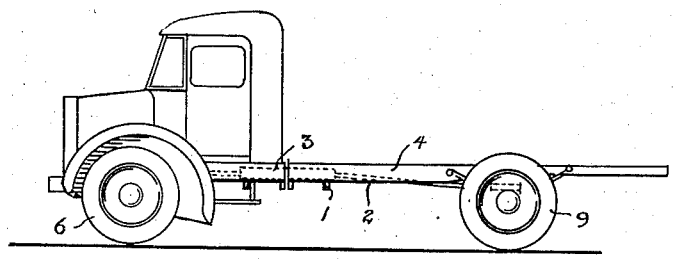
Fig. 1 is an elevational view of the invention.

The numeral 1 indicates generally a truck chassis having a frame 2 and front and rear portions 3 and 4. The front portion is provided in the usual manner with front wheels 6 and the rear portion is provided with a rear axle 7, differential housing 8 and wheels 9.

The frame portion 3 is provided with a pair of transverse members 11 and the portion 4 is provided with a pair of transverse members 12. These members are of channel section of substantial depth to afford ample strength. A large tubular bearing 14 is secured between the members 11 preferably by welding, and a sleeve 15 is journalled in said bearing, which extends through the transverse members 12 and is rigidly connected thereto. The front end of the sleeve is provided with lock nuts 16 between which and the forward transverse member 11 a thrust bearing 17 is provided. Between adjacent members 11 and 12 surrounding the sleeve 15 a thrust bearing 18 is also provided and at the rear end of the sleeve 15 and at the rear side of the rear transverse member 12 a self-aligning bearing 19 of any suitable type is mounted.

Figure 2:
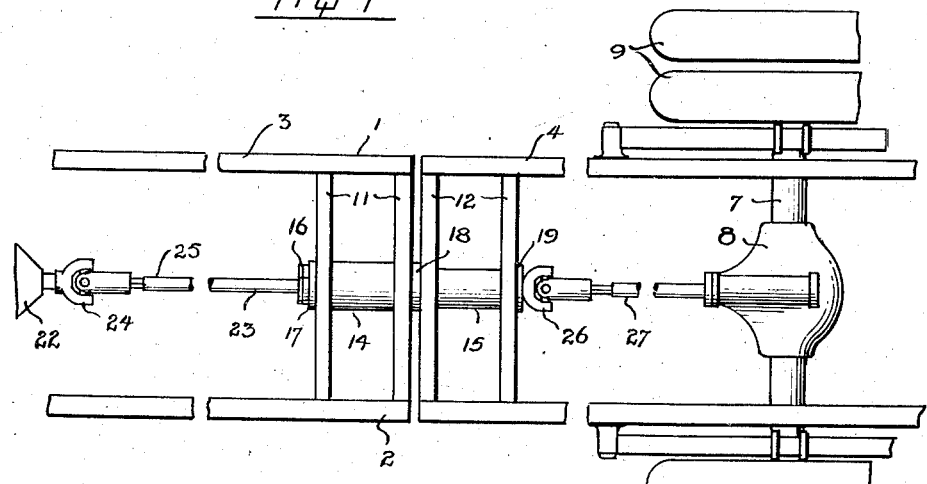
Fig. 2 is a part plan view of the chassis showing the sleeve bearing.
Figure 3:
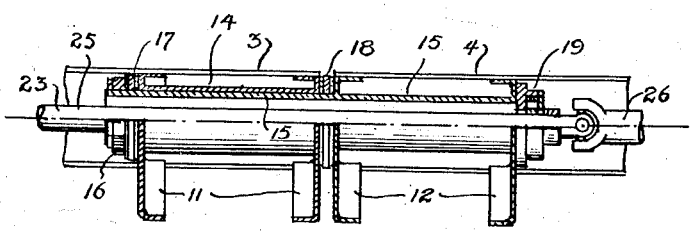
Fig. 3 is an enlarged longitudinal sectional view of the sleeve bearing.

The motor 22, see Figure 2, drives the wheels through a drive shaft, generally indicated by the numeral 23, which includes a universal joint 24 at the rear end of the motor, a splined shaft 25 which passes through the sleeve 15 and is journalled in the self aligning bearing 19, a universal joint 26 and a splined shaft 27 which connects through the differential housing 8 and the differential, not shown, to the rear axle.

The body of the truck would obviously be mounted upon the rear portion 4 of the frame 2, so that when the chassis is twisted about the axis defined by the sleeve 15 and the bearing 12 no twisting strain would be imparted to the body. No twisting strains are imparted to any of the frame members, consequently crystallization of the metal in the frame is overcome and rougher roads can be negotiated without fear of failure or breakdown.

The mounting of a self aligning bearing at the longitudinal axis of rotation of the frame to journal an intermediate portion of the drive shaft parts reduces the end movement of splines adjacent the universal joint 26 and ensures a more perfect alignment of the drive shaft parts than that normally obtained.

If it is desired to change truck bodies, substituting a short truck body for a long platform upon a long frame member, such as that indicated in Figure 2, it suffices to remove the front lock nuts 16, withdraw the rear end frame member and its road wheel parts and enter the sleeve 15 of the desired short truck body frame member into the bearing 14 and replace the lock nuts upon the sleeve and couple up the new drive shaft to the universal joint 26.

What I claim as my invention is:

1. A motor vehicle chassis including a frame adapted to accommodate a driver's seat and a body and being divided transversely adjacent the driver's seat to form a front end portion and a rear end portion, said frame comprising pairs of aligned longitudinal members connected by pairs of spaced transverse members, one pair of said members supporting a sleeve extending longitudinally of one frame end portion and a bearing for said sleeve carried by the spaced transverse members of the other frame end portion.

2. A motor vehicle chassis including a frame adapted to accommodate a driver's seat and a body and being divided transversely adjacent the driver's seat to form a front end portion and a rear end portion, said frame comprising pairs of aligned longitudinal members connected by pairs of spaced transverse members, one pair of said members supporting a sleeve extending longitudinally of one frame end portion and a bearing for said sleeve carried by the spaced transverse members of the other frame end portion, said sleeve being below the upper surface of the frame with its axis substantially level with the mean level of the drive shaft of the motor vehicle.

3. A motor vehicle chassis including a frame adapted to accommodate a driver's seat and a body, and being divided transversely adjacent the driver's seat to form a front end portion and a rear end portion, said frame comprising pairs of relatively long aligned longitudinal members connected by spaced transverse members, one of said members supporting a sleeve extending longitudinally of one frame end portion and a bearing for said sleeve carried by the transverse members of the other frame end portion.

4. A motor vehicle chassis including a frame adapted to accommodate a driver's seat and a body, and being divided transversely adjacent the driver's seat to form a front end portion and a rear end portion, said frame comprising pairs of relatively long aligned longitudinal members connected by spaced transverse members, one of said members supporting a sleeve extending longitudinally of one frame end portion, a bearing for said sleeve carried by the transverse members of the other frame end portion, said sleeve having a bearing in which the drive shaft of the vehicle is adapted to be journalled.

HARRY EDWARD WILLOCK.